US012147341B2

(12) United States Patent
Niu et al.

(10) Patent No.: US 12,147,341 B2
(45) Date of Patent: Nov. 19, 2024

(54) MEMORY CONTROLLER PRIORITIZING WRITING COMPRESSED DATA

(71) Applicant: Alibaba Group Holding Limited, Grand Cayman (KY)

(72) Inventors: Dimin Niu, Sunnyvale, CA (US); Tianchan Guan, Shanghai (CN); Lide Duan, Sunnyvale, CA (US); Hongzhong Zheng, Los Gatos, CA (US)

(73) Assignee: Alibaba Group Holding Limited, George Town (KY)

( * ) Notice: Subject to any disclaimer, the term of this patent is extended or adjusted under 35 U.S.C. 154(b) by 76 days.

(21) Appl. No.: 18/019,812

(22) PCT Filed: Aug. 6, 2020

(86) PCT No.: PCT/CN2020/107550
§ 371 (c)(1),
(2) Date: Feb. 5, 2023

(87) PCT Pub. No.: WO2022/027499
PCT Pub. Date: Feb. 10, 2022

(65) Prior Publication Data
US 2023/0281124 A1    Sep. 7, 2023

(51) Int. Cl.
*G06F 12/0802* (2016.01)
(52) U.S. Cl.
CPC .................. *G06F 12/0802* (2013.01)
(58) Field of Classification Search
CPC .......... G06F 12/0802; G06F 2212/401; G06F 12/0871; G06F 11/1012
(Continued)

(56) References Cited

U.S. PATENT DOCUMENTS 9,344,091 B2   5/2016   Jayasena et al.
9,652,384 B2   5/2017   Trika et al.
(Continued)

FOREIGN PATENT DOCUMENTS

CN   104881240 A   9/2015
WO   2014101514    7/2014
WO   2019243780    12/2019

OTHER PUBLICATIONS

Translation of International Search Report for PCT Application No. PCT/CN2020/107550 dated Feb. 10, 2022, 3 pages.
(Continued)

*Primary Examiner* — Charles Rones
*Assistant Examiner* — Jonah C Krieger
(74) *Attorney, Agent, or Firm* — Lee & Hayes, P.C.

(57) ABSTRACT

Apparatus, method, and system provided herein are directed to prioritizing cache line writing of compressed data. The memory controller comprises a cache line compression engine that receives raw data, compresses the raw data, determines a compression rate between the raw data and the compressed data, determines whether the compression rate is greater than a predetermined rate, and outputs the compressed data as data-to-be-written if the compression rate is greater than the predetermined rate. In response to determining that the compression rate is greater than the predetermined rate, the cache line compression engine generates a compression signal indicating the data-to-be-written is the compressed data and sends the compression signal to a scheduler of a command queue in the memory controller where writing of compressed data is prioritized.

18 Claims, 5 Drawing Sheets

(58) Field of Classification Search
USPC .................................................. 711/103, 118
See application file for complete search history.

(56) References Cited

U.S. PATENT DOCUMENTS

| | | |
|---|---|---|
| 9,740,621 B2 | 8/2017 | Heddes et al. |
| 9,927,998 B2 | 3/2018 | Lee et al. |
| 10,157,013 B2 | 12/2018 | Perlmutter et al. |
| 10,275,165 B2 | 4/2019 | Inoue et al. |
| 10,838,862 B2 | 11/2020 | Heddes et al. |
| 10,895,987 B2 | 1/2021 | Kang et al. |
| 2018/0060235 A1* | 3/2018 | Yap .......................... G06F 12/04 |
| 2019/0243780 A1* | 8/2019 | Gopal .................. G06F 12/0811 |
| 2020/0257457 A1* | 8/2020 | Matsugami ........... G06F 3/0689 |

OTHER PUBLICATIONS

Translation of Written Opinion for PCT Application No. PCT/CN2020/107550, dated Feb. 10, 2022, 5 pages.

* cited by examiner

MEMORY CONTROLLER PRIORITIZING WRITING COMPRESSED DATA

CROSS-REFERENCE TO RELATED PATENT APPLICATIONS

This application claims priority to and is a continuation of PCT Patent Application No. PCT/CN2020/107550 filed on 6 Aug. 2020 and entitled "Memory Controller," which is incorporated herein by reference in its entirety.

BACKGROUND

Among many semiconductor devices utilized in today's electronic devices, such as computers, communication devices, entertainment devices, control systems, and the like, memory devices play an essential role in providing storage space, temporarily or permanently, for operating systems, programs and applications, data, other information, and the like. Designers and manufacturers continue to improve memory design in terms of speed, capacity, cost, power efficiency, control efficiency, etc.

JEDEC provides global open standards for the microelectronic industry, which includes standards for semiconductor memory devices. In the new standard for semiconductor memory devices, the JEDEC Double Data Rate (DDR) 5 (DDR5), memory devices are expected to offer improved performance and power efficiency over the previous generation dynamic random-access memory (DRAM) devices and technologies. The DDR5 is expected to provide, among other improvements, narrower channel width, on-die error-correcting code (ECC), on-the-fly (OTF) burst length allowing dynamic burst length change between 8 and 16 bits. Although DDR5 is expected to define and provide improved bandwidth, further improvement in bandwidth utilization may provide additional overall performance efficiency and improvements.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

An apparatus, a method, and a system for a memory controller, that prioritizes writing compressed data over other scheduled tasks pending in a command queue are provided. The memory controller may be realized as hardware, such as an integrated circuit, software, or a combination of both.

The memory controller may comprise a cache line compression engine that may receive raw data, compress the raw data, determine a compression rate between the raw data and the compressed data, determine whether the compression rate is greater than a predetermined rate, and output the compressed data as data-to-be-written if the compression rate is greater than the predetermined rate. In response to determining that the compression rate is greater than the predetermined rate, the cache line compression engine may generate a compression signal indicating the data-to-be-written is the compressed data and send the compression signal to a scheduler of a command queue in the memory controller. The cache line compression engine may be located, or utilized, in a write data path of the memory controller.

The scheduler may determine whether the data-to-be-written is compressed based on the compression signal from the cache line compression engine, and a compression indication generator of the memory controller may append a compression indicator bit, which is set to a value based on the compression signal, to a write command associated with the data-to-be-written. The compression indication generator may set the compression indicator bit to a first value if the data-to-be-written is not compressed and to a second value if the data-to-be-written is compressed. The scheduler may prioritize writing of the compressed data-to-be-written over other scheduled tasks pending in the command queue.

The memory controller may also comprise an error-correcting code (ECC) provision circuit, which may receive a predetermined number of ECC bits and provision one bit from the predetermined number of ECC bits with the compression signal during a cache line write operation. The memory controller may further comprise a cache line decompression engine and the ECC provision circuit may be further configured to recover a decompression signal by decoding the provisioned bit so that an ECC decompression circuit may decompress data-to-be-read in response to receiving the decompression signal associated with the data-to-be-read, and output the decompressed data-to-be-read. The cache line decompression engine may be located or utilized in a read data path of the memory controller.

Figure 1:
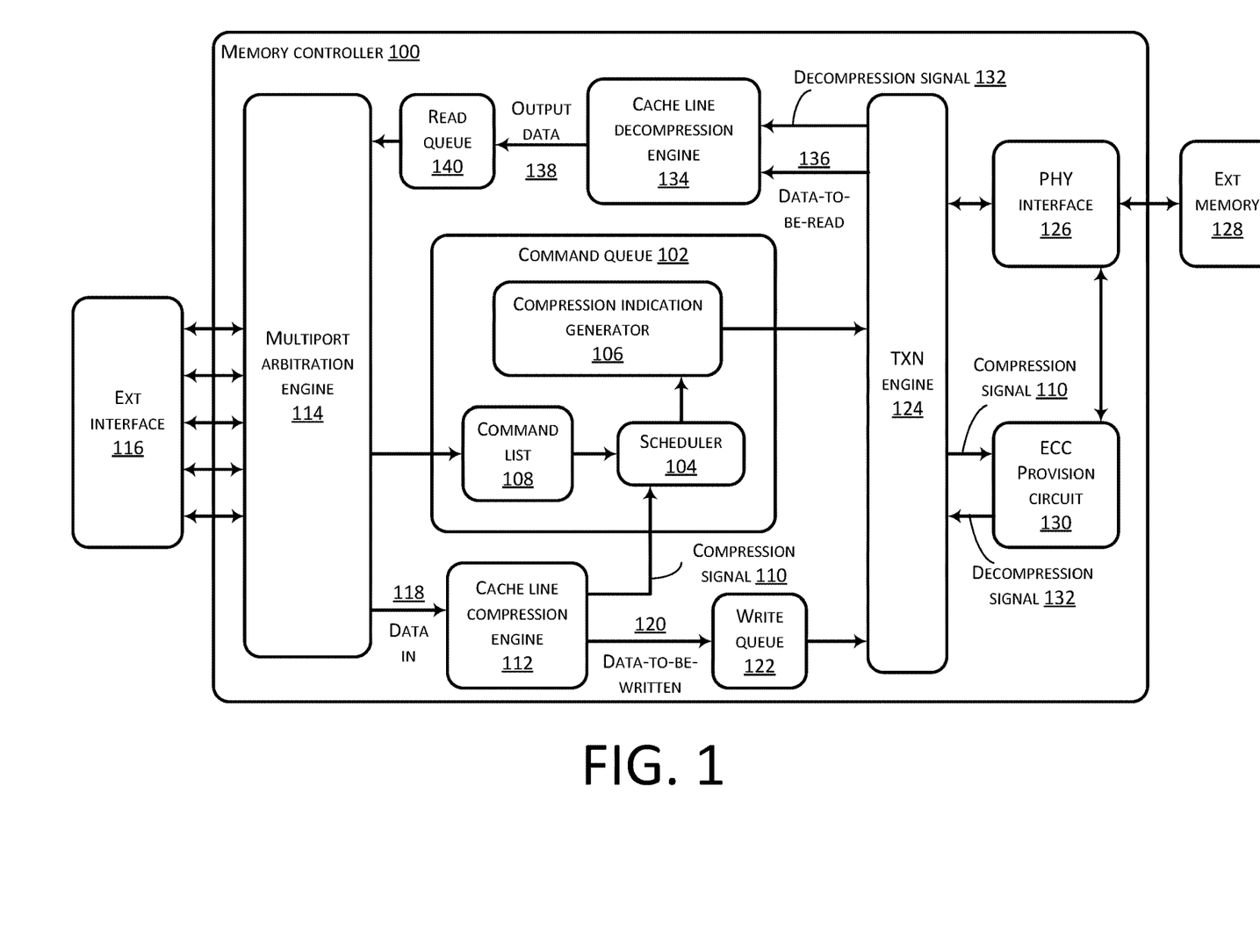
FIG. 1 illustrates an example block diagram of a memory controller with peripheral components.

FIG. 1 illustrates an example block diagram of a memory controller 100 with peripheral components.

The memory controller 100, which may an integrated circuit, may comprise a command queue circuit 102 which may include a scheduler circuit 104, a compression indication generator circuit 106 coupled to the scheduler circuit 104, and a command list 108 coupled to the scheduler circuit 104. The command queue circuit 102, with the components described above, may be configured to prioritize cache line write of data-to-be-written as described below. The scheduler circuit 104 may be configured to determine whether the data-to-be-written is compressed based on a compression signal 110 associated with the data-to-be-written, and the compression indication generator circuit 106 may be configured to append a compression indicator bit to a write command associated with the data-to-be-written. The compression indication generator circuit 106 may generate the compression indicator bit and set to a value based on the compression signal 110. The scheduler circuit 104 may be further configured to prioritize the cache line write of the data-to-be-written based on the value of the compression indicator bit associated with the data-to be written.

The memory controller 100 may further comprise a cache line compression engine 112, which may be located in a write data path of the memory controller 100, coupled to the command queue circuit 102 and a multiport arbitration engine 114 coupled to the cache line compression engine 112. The multiport arbitration engine 114 may connect, via a data bus, to an external interface 116, such as a system on chip (SoC) interface and receive and transmit traffic, which may include data, commands, instructions, and the like. The command list 108 may hold a list of upcoming commands received from the multiport arbitration engine 114. The traffic from the external interface 116 may come from a single source or from multiple sources which may be arbitrated by the multiport arbitration engine 114. Raw data received by the multiport arbitration engine 114 may be forwarded to the cache line compression engine 112 as indicated by a data in arrow 118. The cache line compression engine 112 may be configured to receive the raw data, compress the raw data and generate compressed data, and determine a compression rate between the raw data and the compressed data. In response to determining that the compression rate is greater than a predetermined rate, the cache line compression engine 112 may output the compressed data as the data-to-be-written 120 to a write queue 122 and send the compression signal 110 associated with the data-to-be-written 120 indicating the data-to-be-written 120 is the compressed data to the scheduler circuit 104. In response to determining that the compression rate is not greater than the predetermined rate, the cache line compression engine may output the raw data as the data-to-be-written 120 to the write queue 122 without sending the compression signal 110 to the scheduler circuit 104.

The scheduler 104 may be further configured to determine that the data-to-be-written 120 is compressed in response to receiving the compression signal associated with the data-to-be-written, and determine that the data-to-be-written is not compressed in response to failing to receive the compression signal associated with the data-to-be-written 120. The compression indication generator circuit 106 may be further configured to set the compression indicator bit to a first value, for example, to 0, in response to the scheduler circuit 104 determining that the data-to-be-written is not compressed and set the compression indicator bit to a second value, for example, to 1, in response to the scheduler determining that the data-to-be-written is compressed. The scheduler circuit 104 may then prioritize the cache line write of the data-to-be-written 120 having the second value, i.e., 1, for the compression indicator bit over other scheduled tasks pending in the command queue circuit 102.

The memory controller may further comprise a transaction engine 124 coupled to the compression indication generator circuit 106 and the write queue 122. The transaction engine 124 may be configured to pass the data-to-be-written 120 to a physical interface 126 in order of the prioritization based on the compression indicator bit associated with the data-to-be-written 120. The physical interface 126 may be coupled to an external memory 128, such as a DDR5 memory device. For example, the transaction engine may issue a DDR5 normal command or a special write command for a prioritized cache line write of the compressed data over other scheduled tasks pending in the command queue circuit 102.

The memory controller 100 may further comprise an error-correcting code (ECC) provision circuit 130 communicatively coupled to the cache line compression engine 122 to receive the compression signal 110. The ECC provision circuit 130 may receive the compression signal 110 from the cache line compression engine 112 through the command queue circuit 102 and the transaction engine 124 as illustrated in FIG. 1. The external a memory device 128 may have an ECC built-in with a known predetermined number of bits for the ECC, for example, a DDR5 memory device has an ECC is built-in with 8 bits for the ECC. The ECC provision circuit 130 may be configured to provision a bit from a predetermined number of ECC bits with the compression signal during a cache line write operation as the compression indicator bit. The physical interface 126 may be further configured to receive data-to-be-read and the predetermined number of the ECC bits having a bit provisioned as the compression indicator bit associated with the data-to-be-read from the external memory 128. The physical interface 126 may forward the predetermined number of ECC bits to the ECC provision circuit 130, which may decode the provisioned bit, and if the decoded provisioned bit indicates that the data-to-be-read associated with the provisioned bit is compressed, recover a decompression signal associated with the data-to-be-read. The physical interface 126 may be further configured to forward the data-to-be-read to the transaction engine 124 and the ECC provision circuit 130 may be further configured to forward the decompression signal 132 also to the transaction engine 124.

The memory controller 100 may further comprise a cache line decompression engine 134, coupled to the ECC provision circuit via the transaction engine 124. The cache line decompression engine 134 may be configured to receive the data-to-be-read 136 and the decompression signal 132 associated with the data-to-be-read 136 from the transaction engine 124. The cache line decompression engine 134 may decompress the data-to-be-read 136 in response to receiving the decompression signal 132 associated with the data-to-be-read 136 and output the decompressed data-to-be-read as output data 138 to a read queue 140. Because no depression signal may be generated if the decoded provisioned bit indicates that the data-to-be-read associated with the provisioned bit is not compressed, the cache line decompression engine 134 may output, to the read queue 140, the data-to-be-read 136 without decompressing in response to failing to receive the decompression signal associated with the data-to-be-read 136. As shown in FIG. 1, the cache line decompression engine 134 may be located or utilized in a read data path of the memory controller 100.

Figure 2:
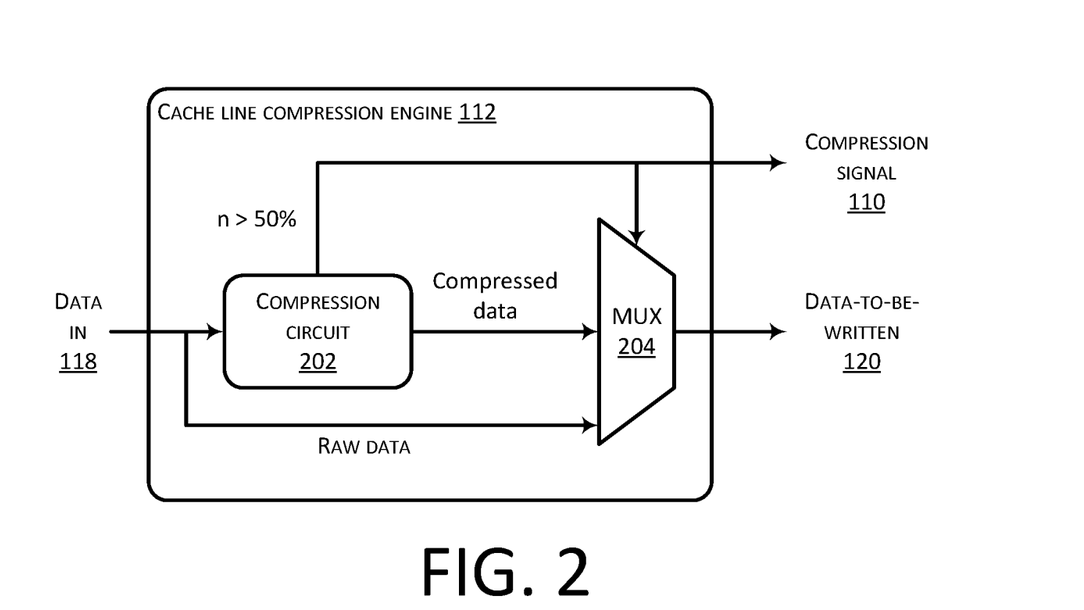
FIG. 2 illustrates an example block diagram of the cache line compression engine as illustrated in FIG. 1.

FIG. 2 illustrates an example block diagram the cache line compression engine 112 illustrated in FIG. 1. The cache line compression engine 112 may comprise a compression circuit 202 which may receive the raw data, shown as data in 118, from the multipart arbitration engine 114, compress the raw data, and evaluate a compression rate between the raw data and the compressed data. If the compression rate, n=(compressed data size)/(raw data size), is greater than the predetermined rate, n=0.5 or 50% for example as shown in FIG. 2, the compression circuit 202 may generate the compression signal 110 and send it to the scheduler circuit 104 as described above with reference to FIG. 1. The cache line compression engine 112 may further comprise a multiplexer 204 coupled to the compression circuit 202. The multiplexer 204 may be configured to receive the raw data, the compressed data, and the compression signal 110 associated with the compressed data. The multiplexer 204 may output the compressed data as the data-to-be-written if the multiplexer 204 receives the compression signal 110 associated with the raw data, and output the raw data as the data-to-be-written 120 if the multiplexer 204 does not receive the compression signal 110 associated with the raw data.

Figure 3:
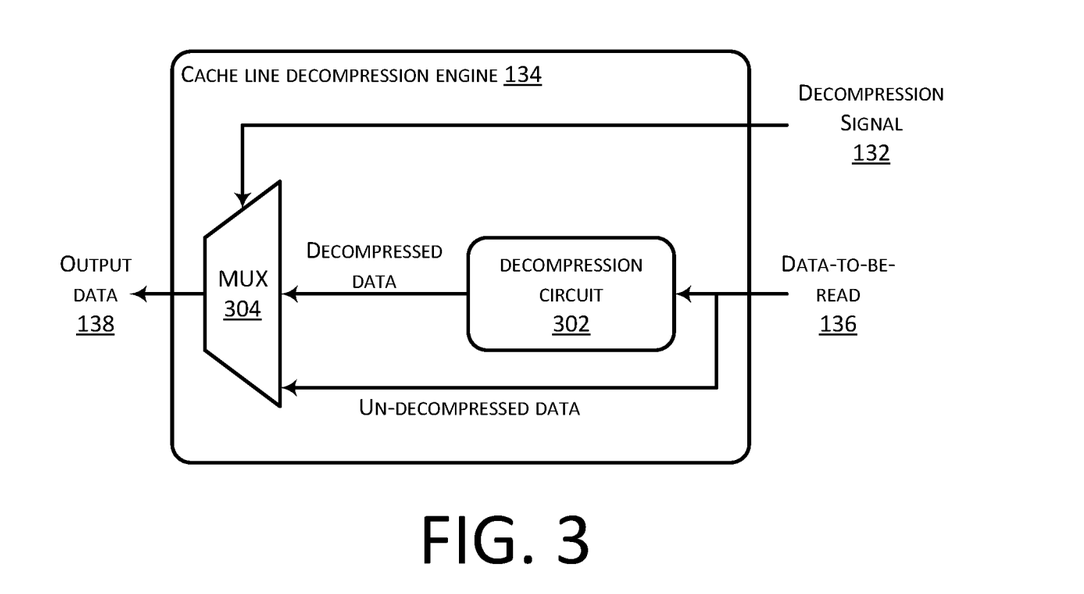
FIG. 3 illustrates an example block diagram of the cache line decompression engine as illustrated in FIG. 1.

FIG. 3 illustrates an example block diagram the cache line decompression engine 134 illustrated in FIG. 1. The cache line decompression engine 134 may comprise a decompression circuit 302 which may receive the data-to-be-read 136 from external memory 128 through the physical interface 126 and the transaction engine 124 and decompress the data-to-be-read 136. The cache line decompression engine 134 may further comprise a multiplexer 304 coupled to the decompression circuit 302. The multiplexer 304 may be configured to receive the decompressed data, un-decompressed data, or the data-to-be-read 136 without being decompressed, and the decompression signal 132 associated with the data-to-be-read 136. As discussed above with reference to FIG. 1, the ECC provision circuit 130 may decode the provisioned bit associated with the data-to-be-read 136, and if the decoded provisioned bit indicates that the data-to-be-read 136 associated with the provisioned bit is compressed, recover the decompression signal 132 associated with the data-to-be-read 136, and forward the decompression signal 132 to the cache line decompression engine 134. The multiplexer 304 may output the decompressed data as the output data 138 if the multiplexer 304 receives the decompression signal 132 associated with the data-to-be-read 136, and output the data-to-be-read 136 without decompressing as the output data 138 if the multiplexer 304 does not receive the decompression signal 134 associated with the data-to-be read 136.

Figure 4:
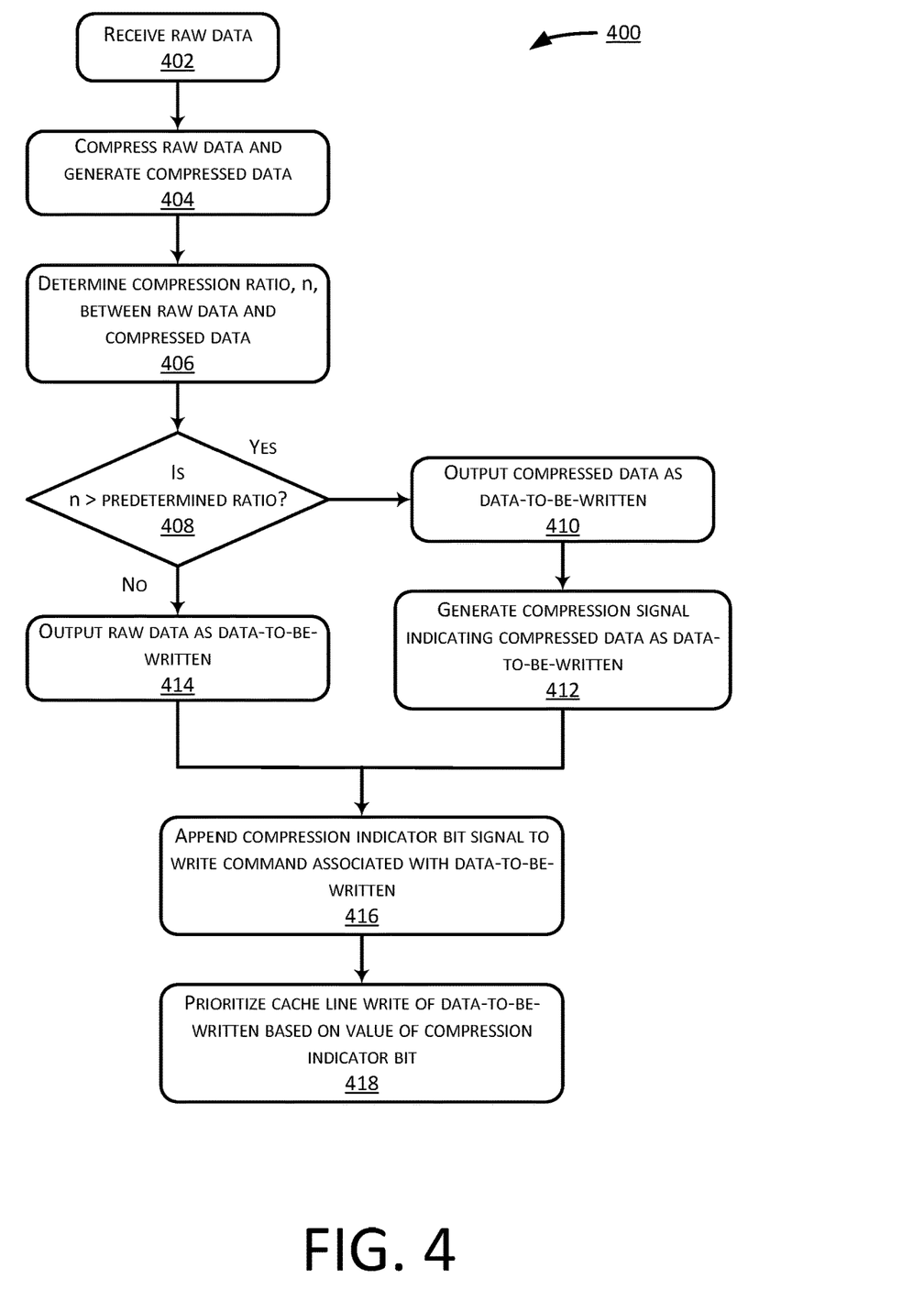
FIG. 4 illustrates an example process performed by the memory controller as illustrated in FIGS. 1-3.

FIG. 4 illustrates an example process 400 for a cache line write operation performed by the memory controller 100 illustrated in FIGS. 1-3.

At block 402, the memory controller 100 may receive raw data, compress the raw data and generate the compressed raw data (compressed data) at block 404, and determine a compression rate, n, between the raw data and the compressed data at block 406. The raw data and other data may be transferred over a data bus, system bus, and the like to and from various types of processors. As described above with reference to FIG. 2, the compression rate, n, may be defined as n=(compressed data size)/(raw data size). In response to determining that the compression rate is greater than a predetermined rate at block 408, the compressed data may be output as data-to-be-written at block 410 and a compression signal indicating the data-to-be-written is the compressed data may be generated at block 412. Upon the compression signal indicating the data-to-be-written is compressed, a bit from a predetermined number of error correcting code (ECC) bits may be provisioned with the compression signal during a cache line write operation. In response to determining that the compression rate is not greater than the predetermined rate, the raw data may be output as the data-to-be-written at block 414.

Determining whether the data-to-be-written is compressed may include determining that the data-to-be-written is compressed in response to receiving the compression signal associated with the data-to-be-written, and determining that the data-to-be-written is not compressed in response to failing to receive the compression signal associated with the data-to-be-written. As described above reference to FIGS. 1 and 2, blocks 402-414 may be performed by the cache line compression engine 112 of the memory controller 100 in a write data path of the memory controller 100.

At block 416, a compression indicator bit, which may be set to a value based on the compression signal, may be appended to a write command associated with the data-to-be-written. For example, the compression indicator bit may be set to a first value, such as 0, in response to determining that the data-to-be-written is not compressed, and be set to a second value, such as 1, in response to determining that the data-to-be-written is compressed. At block 418, cache line write of the data-to-be-written may be prioritized based on the value of the compression indicator bit associated with the data-to be written. For example, the cache line write of the data-to-be-written having the second value for the compression indicator bit, i.e., the value being equal to 1 indicating that the data-to-be written is compressed, may be prioritized over other scheduled tasks pending in the command queue.

Figure 5:
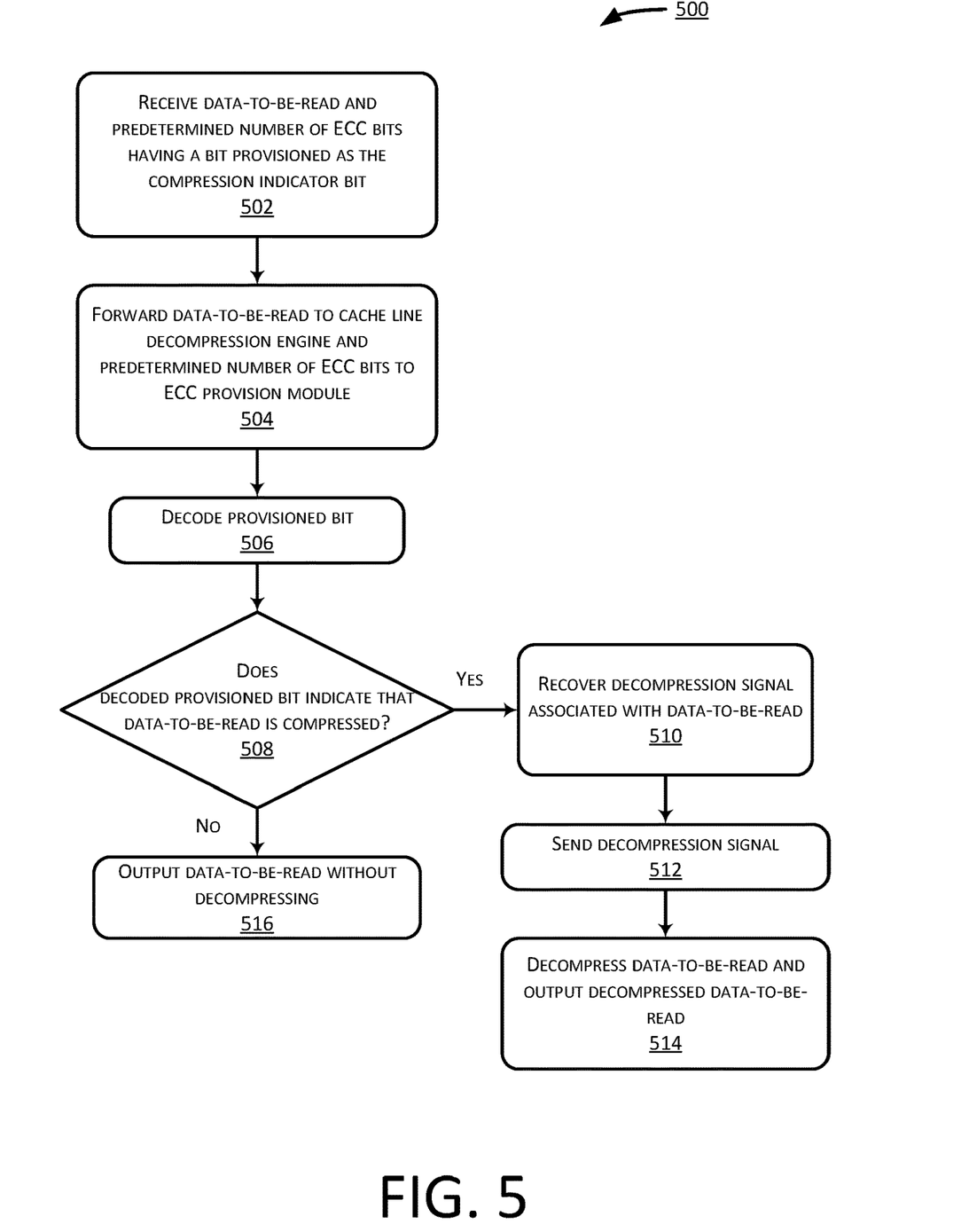
FIG. 5 illustrates an example process for a cache line read operation performed by the memory controller 100 as illustrated in FIGS. 1-3.

FIG. 5 illustrates an example process 500 for a cache line read operation performed by the memory controller 100 illustrated in FIGS. 1-3.

At block 502, the memory controller 100 may receive data-to-be-read and the predetermined number of ECC bits having a bit provisioned as the compression indicator bit associated with the data-to-be-read. At block 504, the data-to-be-read may be forwarded to the cache line decompression engine 134 and the predetermined number of ECC bits may be forwarded to the ECC provision circuit as described with reference to FIGS. 1 and 3. At block 506, the provisioned bit may be decoded, and whether the decoded provisioned bit indicates the data-to-be-read associated with the provisioned bit is compressed is determined at block 508. If the decoded provisioned bit is determined to indicate that the data-to-be-read is compressed, a decompression signal associated with the data-to-be-read may be recovered at block 510, and the decompression signal may be sent to the cache line decompression engine 134 at block 512. At block 514, in response to receiving the decompression signal associated with the data-to-be-read, the cache line decompression engine 134 may decompressing data-to-be-read and output the decompressed data-to-be-read. If the decoded provisioned bit is not determined to indicate that the data-to-be-read is compressed, no decompression signal associated with the data-to-be-read may be generated, and the data-to-be-read without being decompressed is output at block 516. As described above, decompressing the data-to-be-read in response to receiving the decompression signal may be performed in a read data path of the memory controller 100.

Figure 6:
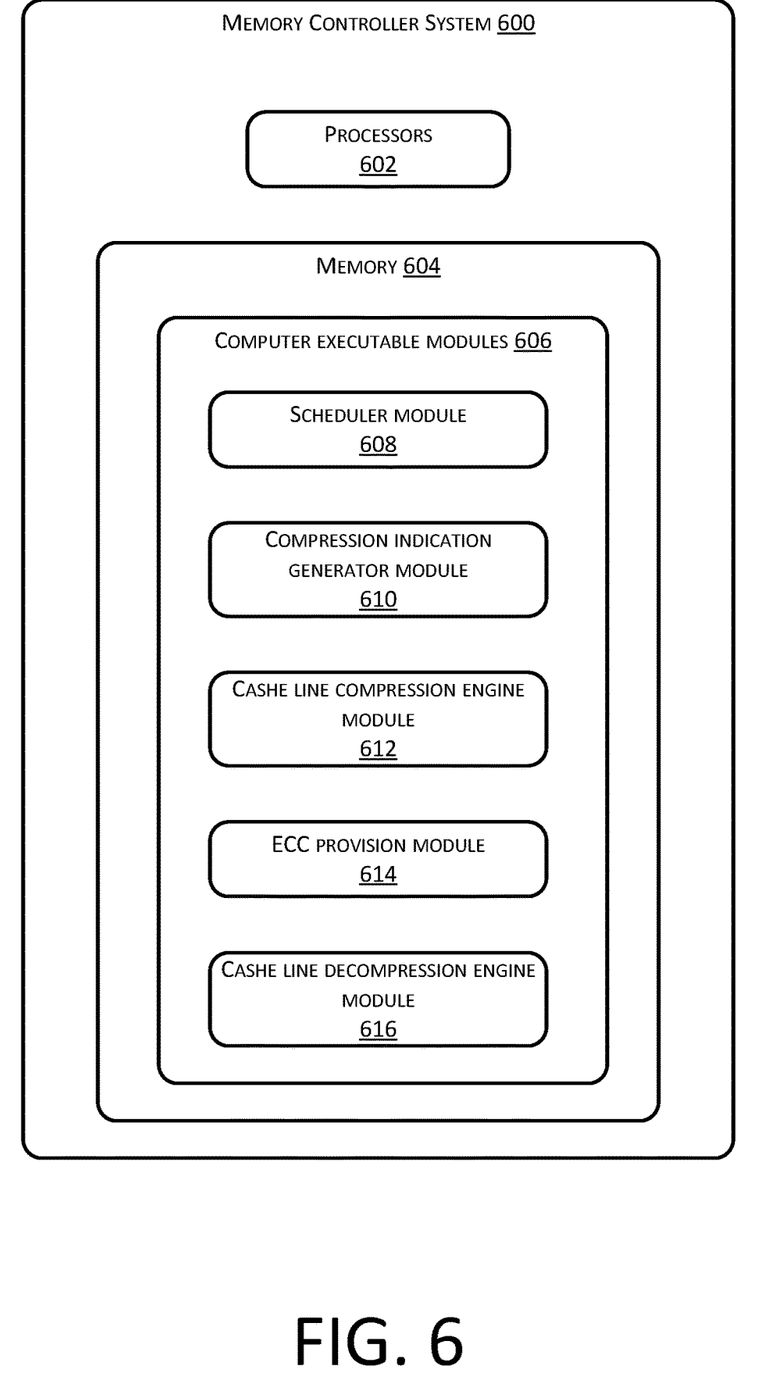
FIG. 6 illustrates an example memory controller system.

FIG. 6 illustrates an example memory controller system 600. The memory controller system 600 may comprise one or more processors (processors) 602 and memory 604 coupled to the processors 602. The memory 604 may store computer executable modules 606 that, when executed by the processors 602, perform associated functions. The computer executable modules 606 may include a scheduler module 608 configured to schedule tasks in the command queue and determine whether data-to-be-written is compressed based on a compression signal associated with the data-to-be-written and a compression indication generator module 610 configured to append a compression indicator bit, which may be set a value based on the compression signal, to a write command associated with the data-to-be-written. The scheduler module 608 may be further configured to prioritize, over other scheduled pending tasks in the command queue, cache line write of the data-to-be-written based on the value of the compression indicator bit associated with the data-to be written.

The compression indication generator module 610 may be further configured to set the compression indicator bit to a first value, for example, 0, in response to the scheduler module determining that the data-to-be-written is not compressed and set the compression indicator bit to a second value, for example, 1, in response to the scheduler module determining that the data-to-be-written is compressed. The scheduler module 608 may be further configured to prioritize the cache line write of the data-to-be-written having the second value for the compression indicator bit over other scheduled tasks pending in the command queue.

The computer executable modules 606 may further include a cache line compression engine module 612, which may be configured to receive raw data, generate compressed data by compressing the raw data, and determine a compression rate, n, between the raw data and the compressed data, n=(compressed data size)/(raw data size) for example. The cache line compression engine module 612 may, in response to determining that the compression rate is greater than a predetermined rate, n=0.5 or 50% for example as shown in FIG. 2, output the compressed data as the data-to-be-written, generate the compression signal indicating the data-to-be-written is the compressed data, and send the compression signal to the scheduler module 608. The cache line compression engine module 612 may, in response to determining that the compression rate is not greater than the predetermined rate, output the raw data as the data-to-be-written. The cache line compression engine module 612 may be configured to perform in a write data path of the memory controller system 600.

The scheduler module 608 may be further configured to determine that the data-to-be-written is compressed in response to receiving the compression signal associated with the data-to-be-written, and determine that the data-to-be-written is not compressed in response to failing to receive the compression signal associated with the data-to-be-written.

The computer executable modules 606 may further include an error-correcting code (ECC) provision module 614. As described above with reference to FIG. 1, a DDR5 memory device has an ECC is built-in with 8 bits for the ECC, and the ECC provision module 614 may be configured to provision a bit from a predetermined number of ECC bits, 8 bits for example, with the compression signal during a cache line write operation as the compression indicator bit. The ECC provision module 614 may be further configured to receive the predetermined number of the ECC bits having a bit provisioned as the compression indicator bit associated with data-to-be-read, decode the provisioned bit, and recover the decompression signal if the decoded provisioned bit indicates that the data-to-be-read associated with the provisioned bit is compressed.

The computer executable modules 606 may further include a cache line decompression engine module 616. The cache line decompression engine module 616 may be configured to receive the data-to-be-read, decompress the data-to-be-read in response to receiving the decompression signal associated with the data-to-be-read, and output the decompressed data-to-be-read. The decompression engine module 616 may be further configured output the data-to-be-read without decompressing in response to failing to receive the decompression signal associated with the data-to-be-read. The cache line decompression engine module 616 may be configured to perform in a read data path of the memory controller system 600.

Some or all operations of the methods described above can be performed by execution of computer-readable instructions or computer executable modules stored on a computer-readable storage medium, as defined below. The term "computer-readable instructions" and "computer executable modules" as used in the description and claims, include routines, applications, application modules, program modules, programs, components, data structures, algorithms, and the like. Computer-readable instructions and computer executable modules can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions or computer executable modules stored on one or more non-transitory computer-readable storage media that, when executed by one or more processors, may perform operations described above with reference to FIGS. 1-6. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

EXAMPLE CLAUSES

A. An integrated circuit for a memory controller comprising: a command queue circuit configured to prioritize cache line write of data-to-be-written, the command queue circuit comprising: a scheduler circuit configured to determine whether the data-to-be-written is compressed based on a compression signal associated with the data-to-be-written; and a compression indication generator circuit coupled to the scheduler circuit, the compression indication generator circuit configured to append a compression indicator bit to a write command associated with the data-to-be-written, the compression indicator bit set to a value based on the compression signal, wherein the scheduler circuit is further configured to prioritize the cache line write of the data-tobe-written based on the value of the compression indicator bit associated with the data-to be written.

B. The memory controller as paragraph A recites, further comprising a cache line compression engine coupled to the command queue circuit, the cache line compression engine configured to: receive raw data; generate compressed data by compressing the raw data; determine a compression rate between the raw data and the compressed data; in response to determining that the compression rate is greater than a predetermined rate: output the compressed data as the data-to-be-written, generate the compression signal indicating the data-to-be-written is the compressed data, and send the compression signal to the scheduler circuit; and in response to determining that the compression rate is not greater than the predetermined rate, output the raw data as the data-to-be-written.

C. The memory controller as paragraph B recites, wherein the cache line compression engine is located in a write data path of the memory controller.

D. The memory controller as paragraph B recites, wherein the scheduler circuit is further configured to: determine that the data-to-be-written is compressed in response to receiving the compression signal associated with the data-to-be-written, and determine that the data-to-be-written is not compressed in response to failing to receive the compression signal associated with the data-to-be-written.

E. The memory controller as paragraph A recites, wherein compression indication generator circuit is further configured to: set the compression indicator bit to a first value in response to the scheduler circuit determining that the data-to-be-written is not compressed; and set the compression indicator bit to a second value in response to the scheduler determining that the data-to-be-written is compressed.

F. The memory controller as paragraph E recites, wherein the scheduler circuit is further configured to prioritize the cache line write of the data-to-be-written having the second value for the compression indicator bit.

G. The memory controller as paragraph A recites, further comprising an error-correcting code (ECC) provision circuit coupled to the cache line compression engine, the ECC provision circuit configured to provision a bit from a predetermined number of ECC bits with the compression signal during a cache line write operation as the compression indicator bit.

H. The memory controller as paragraph G recites, further comprising a cache line decompression engine coupled to the ECC provision circuit, the cache line decompression engine configured to: receive data-to-be-read; decompress data-to-be-read in response to receiving a decompression signal associated with the data-to-be-read and output the decompressed data-to-be-read; and output the data-to-be-read in response to failing to receive the decompression signal associated with the data-to-be-read, wherein the ECC provision circuit is further configured to: receive the predetermined number of the ECC bits having a bit provisioned as the compression indicator bit associated with the data-to-be-read, decode the provisioned bit, and recover the decompression signal if the decoded provisioned bit indicates that the data-to-be-read associated with the provisioned bit is compressed.

I. The memory controller as paragraph H recites, wherein the cache line decompression engine is located in a read data path of the memory controller.

J. A method performed by a memory controller, the method comprising: determining whether data-to-be-written is compressed based on a compression signal associated with the data-to-be-written; appending a compression indicator bit to a write command associated with the data-to-be-written, the compression indicator bit set to a value based on the compression signal; and prioritizing cache line write of the data-to-be-written based on a value of the compression indicator bit associated with the data-to be written.

K. The method as paragraph J recites, further comprising: receiving raw data; generating compressed data by compressing the raw data; determining a compression rate between the raw data and the compressed data; in response to determining that the compression rate is greater than a predetermined rate: outputting the compressed data as the data-to-be-written, and generating the compression signal indicating the data-to-be-written is the compressed data; and in response to determining that the compression rate is not greater than the predetermined rate, outputting the raw data as the data-to-be-written.

L. The method as paragraph K recites, wherein generating the compressed data by compressing the raw data is performed in a write data path of the memory controller.

M. The method as paragraph K recites, wherein determining whether the data-to-be-written is compressed based on the compression signal associated with the data-to-be-written includes: determining that the data-to-be-written is compressed in response to receiving the compression signal associated with the data-to-be-written, and determining that the data-to-be-written is not compressed in response to failing to receive the compression signal associated with the data-to-be-written.

N. The method as paragraph J recites, further comprising: setting the compression indicator bit to a first value in response to determining that the data-to-be-written is not compressed; and setting the compression indicator bit to a second value in response to determining that the data-to-be-written is compressed.

O. The method as paragraph N recites, wherein prioritizing the cache line write of the data-to-be-written based on the value of the compression indicator bit associated with the data-to be written includes: prioritizing the cache line write of the data-to-be-written having the second value for the compression indicator bit.

P. The method as paragraph J recites, further comprising provisioning a bit from a predetermined number of error correcting code (ECC) bits with the compression signal during a cache line write operation.

Q. The method as paragraph P recites, further comprising: receiving data-to-be-read; receiving the predetermined number of ECC bits having a bit provisioned as the compression indicator bit associated with the data-to-be-read; decoding the provisioned bit; recovering the decompression signal if the decoded provisioned bit indicates that the data-to-be-read associated with the provisioned bit is compressed; sending the decompression signal; decompressing data-to-be-read in response to receiving the decompression signal associated with the data-to-be-read and outputting the decompressed data-to-be-read; and outputting the data-to-be-read in response to failing to receive the decompression signal associated with the data-to-be-read.

R. The method as paragraph Q recites, wherein decompressing data-to-be-read in response to receiving the decompression signal is performed in a read data path of the memory controller.

S. A memory controller system comprising: one or more processors; memory coupled to the one or more processors, the memory storing computer executable modules that, when executed by the one or more processors, perform associated functions, the computer executable modules including: a scheduler module configured to determine whether data-to-be-written is compressed based on a compression signal associated with the data-to-be-written; and a compression indication generator module configured to append a compression indicator bit to a write command associated with the data-to-be-written, the compression indicator bit set to a value based on the compression signal, wherein the scheduler module is further configured to prioritize cache line write of the data-to-be-written based on the value of the compression indicator bit associated with the data-to be written.

T. The memory controller system as paragraph S recites, wherein the computer executable modules further include a cache line compression engine module, the cache line compression engine configured to: receive raw data; generate compressed data by compressing the raw data; determine a compression rate between the raw data and the compressed data; in response to determining that the compression rate is greater than a predetermined rate: output the compressed data as the data-to-be-written, generate the compression signal indicating the data-to-be-written is the compressed data, and send the compression signal to the scheduler module; and in response to determining that the compression rate is not greater than the predetermined rate, output the raw data as the data-to-be-written.

U. The memory controller system as paragraph T recites, wherein the cache line compression engine module is further configured to perform in a write data path of the memory controller system.

V. The memory controller system as paragraph T recites, wherein the scheduler module is further configured to: determine that the data-to-be-written is compressed in response to receiving the compression signal associated with the data-to-be-written, and determine that the data-to-be-written is not compressed in response to failing to receive the compression signal associated with the data-to-be-written.

W. The memory controller system as paragraph S recites, wherein the compression indication generator module is further configured to: set the compression indicator bit to a first value in response to the scheduler module determining that the data-to-be-written is not compressed; and set the compression indicator bit to a second value in response to the scheduler module determining that the data-to-be-written is compressed.

X. The memory controller system as paragraph W recites, wherein the scheduler module is further configured to prioritize the cache line write of the data-to-be-written having the second value for the compression indicator bit.

Y. The memory controller system as paragraph S recites, wherein the computer executable modules further include an error-correcting code (ECC) provision module, the ECC provision module configured to provision a bit from a predetermined number of ECC bits with the compression signal during a cache line write operation as the compression indicator bit.

Z. The memory controller system as paragraph Y recites, wherein the computer executable modules further include a cache line decompression engine module, the cache line decompression engine module configured to: receive data-to-be-read; decompress data-to-be-read in response to receiving a decompression signal associated with the data-to-be-read and output the decompressed data-to-be-read; and output the data-to-be-read in response to failing to receive the decompression signal associated with the data-to-be-read, wherein the ECC provision module is further configured to: receive the predetermined number of the ECC bits having a bit provisioned as the compression indicator bit associated with the data-to-be-read, decode the provisioned bit, and recover the decompression signal if the decoded provisioned bit indicates that the data-to-be-read associated with the provisioned bit is compressed.

AA. The memory controller system as paragraph Z recites, wherein the cache line decompression engine module is configured to perform in a read data path of the memory controller.

AB. One or more computer-readable storage media storing computer executable modules that, when executed by one or more processors, cause the computer executable modules to perform associated functions, the computer executable modules including: a scheduler module configured to determine whether data-to-be-written is compressed based on a compression signal associated with the data-to-be-written; and a compression indication generator module configured to append a compression indicator bit to a write command associated with the data-to-be-written, the compression indicator bit set to a value based on the compression signal, wherein the scheduler module is further configured to prioritize cache line write of the data-to-be-written based on the value of the compression indicator bit associated with the data-to be written.

AC. The one or more computer-readable storage media as paragraph AB recites, wherein the computer executable modules further include a cache line compression engine module, the cache line compression engine configured to: receive raw data; generate compressed data by compressing the raw data; determine a compression rate between the raw data and the compressed data; in response to determining that the compression rate is greater than a predetermined rate: output the compressed data as the data-to-be-written, generate the compression signal indicating the data-to-be-written is the compressed data, and send, to the scheduler module, the compression signal indicating the data-to-be-written is the compressed data; and in response to determining that the compression rate is not greater than the predetermined rate, output the raw data as the data-to-be-written.

AD. The one or more computer-readable storage media as paragraph AC recites, wherein the cache line compression engine module is further configured to perform in a write data path of the memory controller system.

AE. The one or more computer-readable storage media as paragraph AC recites, wherein the scheduler module is further configured to: determine that the data-to-be-written is compressed in response to receiving the compression signal associated with the data-to-be-written, and determine that the data-to-be-written is not compressed in response to failing to receive the compression signal associated with the data-to-be-written.

AF. The one or more computer-readable storage media as paragraph AB recites, wherein the compression indication generator module is further configured to: set the compression indicator bit to a first value in response to the scheduler module determining that the data-to-be-written is not compressed; and set the compression indicator bit to a second value in response to the scheduler module determining that the data-to-be-written is compressed.

AG. The one or more computer-readable storage media as paragraph AF recites, wherein the scheduler module is further configured to prioritize the cache line write of the data-to-be-written having the second value for the compression indicator bit.

AH. The one or more computer-readable storage media as paragraph AB recites, wherein the computer executable modules further include an error-correcting code (ECC) provision module, the ECC provision module configured to provision a bit from a predetermined number of ECC bits with the compression signal during a cache line write operation as the compression indicator bit.

AI. The one or more computer-readable storage media as paragraph AH recites, wherein the computer executable modules further include a cache line decompression engine module, the cache line decompression engine module configured to: receive data-to-be-read; decompress data-to-be-read in response to receiving a decompression signal associated with the data-to-be-read and output the decompressed data-to-be-read; and output the data-to-be-read in response to failing to receive the decompression signal associated with the data-to-be-read, wherein the ECC provision module is further configured to: receive the predetermined number of the ECC bits having a bit provisioned as the compression indicator bit associated with the data-to-be-read, decode the provisioned bit, and recover the decompression signal if the decoded provisioned bit indicates that the data-to-be-read associated with the provisioned bit is compressed.

AJ. The one or more computer-readable storage media as paragraph AI recites, wherein the cache line decompression engine module is configured to perform in a read data path of the memory controller.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An integrated circuit for a memory controller comprising:
   a command queue circuit comprising:
      a scheduler circuit configured to determine whether data-to-be-written is compressed based on a compression signal associated with the data-to-be-written; and
      a compression indication generator circuit coupled to the scheduler circuit, the compression indication generator circuit configured to append a first compression indicator bit to a write command associated with the data-to-be-written, the first compression indicator bit set to a value based on the compression signal; and
   an error-correcting code (ECC) provision circuit configured to:
      provision a first bit from a first predetermined number of first ECC bits with the compression signal during a cache line write operation as the first compression indicator bit; and
      receive a second predetermined number of second ECC bits having a second bit provisioned as a second compression indicator bit associated with data-to-be-read.

2. The integrated circuit for the memory controller of claim 1, further comprising a cache line compression engine coupled to the command queue circuit, wherein the cache line compression engine is configured to:
   receive raw data;
   generate compressed data by compressing the raw data;
   determine a compression rate between the raw data and the compressed data;
   in response to determining that the compression rate is greater than a predetermined rate:
      output the compressed data as the data-to-be-written,
      generate the compression signal indicating the data-to-be-written is the compressed data, and
      send the compression signal to the scheduler circuit; and
   in response to determining that the compression rate is not greater than the predetermined rate, output the raw data as the data-to-be-written.

3. The integrated circuit for the memory controller of claim 2, wherein the cache line compression engine is located in a write data path of the memory controller.

4. The integrated circuit for the memory controller of claim 2, wherein the scheduler circuit is further configured to:
   determine that the data-to-be-written is compressed in response to receiving the compression signal associated with the data-to-be-written, and
   determine that the data-to-be-written is not compressed in response to failing to receive the compression signal associated with the data-to-be-written.

5. The integrated circuit for the memory controller of claim 1, wherein the scheduler circuit is further configured to prioritize a cache line write of the data-to-be-written based on the value of the first compression indicator bit associated with the data-to-be-written.

6. The integrated circuit for the memory controller of claim 5, wherein the compression indication generator circuit is further configured to:
   set the first compression indicator bit to a first value in response to the scheduler circuit determining that the data-to-be-written is not compressed; and
   set the first compression indicator bit to a second value in response to the scheduler circuit determining that the data-to-be-written is compressed.

7. The integrated circuit for the memory controller of claim 6, wherein the scheduler circuit is further configured to prioritize the cache line write of the data-to-be-written having the second value for the first compression indicator bit.

8. The integrated circuit for the memory controller of claim 1, further comprising a cache line decompression engine coupled to the ECC provision circuit, wherein:
   the cache line decompression engine is configured to:
      receive the data-to-be-read;
      decompress the data-to-be-read in response to receiving a decompression signal associated with the data-to-be-read and output the decompressed data-to-be-read; and
      output the data-to-be-read in response to failing to receive the decompression signal associated with the data-to-be-read, and
   the ECC provision circuit is further configured to:
      decode the second bit; and
      recover the decompression signal if the decoded second bit indicates that the data-to-be-read associated with the second bit is compressed.

9. The integrated circuit for the memory controller of claim 8, wherein the cache line decompression engine is located in a read data path of the memory controller.

10. A memory controller system comprising:
    one or more processors; and
    memory coupled to the one or more processors, the memory storing computer executable instructions that, when executed by the one or more processors, cause the one or more processors to perform operations including:
- determining whether data-to-be-written is compressed based on a compression signal associated with the data-to-be-written;
- appending a first compression indicator bit to a write command associated with the data-to-be-written, the first compression indicator bit set to a value based on the compression signal;
- provisioning a first bit from a first predetermined number of first ECC bits with the compression signal during a cache line write operation as the first compression indicator bit; and
- receiving a second predetermined number of second ECC bits having a second bit provisioned as a second compression indicator bit associated with data-to-be-read.

11. The memory controller system of claim 10, the operations further comprising:
- receiving raw data;
- generating compressed data by compressing the raw data;
- determining a compression rate between the raw data and the compressed data;
- in response to determining that the compression rate is greater than a predetermined rate:
  - outputting the compressed data as the data-to-be-written,
  - generating the compression signal indicating the data-to-be-written is the compressed data, and
  - sending the compression signal; and
- in response to determining that the compression rate is not greater than the predetermined rate, outputting the raw data as the data-to-be-written.

12. The memory controller system of claim 11, the operations further comprising: performing the appending of the first compression indicator to the write command associated with the data-to-be-written in a write data path of the memory controller system.

13. The memory controller system of claim 11, the operations further comprising:
- determining that the data-to-be-written is compressed in response to receiving the compression signal associated with the data-to-be-written, and
- determining that the data-to-be-written is not compressed in response to failing to receive the compression signal associated with the data-to-be-written.

14. The memory controller system of claim 10, the operations further comprising: prioritizing a cache line write of the data-to-be-written based on the value of the first compression indicator bit associated with the data-to-be-written.

15. The memory controller system of claim 14, the operations further comprising:
- setting the first compression indicator bit to a first value in response to determining that the data-to-be-written is not compressed; and
- setting the first compression indicator bit to a second value in response to determining that the data-to-be-written is compressed.

16. The memory controller system of claim 15, the operations further comprising:
- prioritizing the cache line write of the data-to-be-written having the second value for the first compression indicator bit.

17. The memory controller system of claim 10, the operations further comprising:
- receiving data-to-be-read;
- decompressing data-to-be-read in response to receiving a decompression signal associated with the data-to-be-read and output the decompressed data-to-be-read;
- outputting the data-to-be-read in response to failing to receive the decompression signal associated with the data-to-be-read;
- receiving the predetermined number of the ECC bits having a bit provisioned as the compression indicator bit associated with the data-to-be-read;
- decoding the second bit; and
- recovering the decompression signal if the decoded second bit indicates that the data-to-be-read associated with the second bit is compressed.

18. One or more computer-readable storage media storing computer executable instructions that, when executed by one or more processors, cause the one or more processors to perform operations including:
- determining whether data-to-be-written is compressed based on a compression signal associated with the data-to-be-written;
- appending a first compression indicator bit to a write command associated with the data-to-be-written, the first compression indicator bit set to a value based on the compression signal;
- provisioning a first bit from a first predetermined number of first ECC bits with the compression signal during a cache line write operation as the first compression indicator bit; and
- receiving a second predetermined number of second ECC bits having a second bit provisioned as a second compression indicator bit associated with data-to-be-read.

* * * * *